(12) United States Patent
Aoki

(10) Patent No.: US 9,644,943 B2
(45) Date of Patent: May 9, 2017

(54) IMAGING DEVICE

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/483,555

(22) Filed: Sep. 11, 2014

(65) Prior Publication Data

US 2014/0376005 A1    Dec. 25, 2014

Related U.S. Application Data

(63) Continuation of application No. PCT/JP2012/058163, filed on Mar. 28, 2012.

(51) Int. Cl.

| G01B 11/26 | (2006.01) |
| G01J 1/08 | (2006.01) |
| G01B 11/00 | (2006.01) |
| G01S 17/46 | (2006.01) |
| G01J 1/42 | (2006.01) |
| G01B 11/02 | (2006.01) |

(52) U.S. Cl.
CPC .......... *G01B 11/002* (2013.01); *G01B 11/026* (2013.01); *G01J 1/08* (2013.01); *G01J 1/42* (2013.01); *G01S 17/46* (2013.01)

(58) Field of Classification Search
CPC ................. G01B 11/026; G01J 1/08
USPC .... 356/237.1–241.6, 242.1–243.8, 426–431, 356/600–640
See application file for complete search history.

(56) References Cited

U.S. PATENT DOCUMENTS

| 3,436,556 A | * | 4/1969 | McCartney | G01B 11/12 250/223 R |
| 4,152,624 A | * | 5/1979 | Knaebel | H01L 33/483 257/434 |
| 4,577,259 A | * | 3/1986 | Latasiewicz | H05K 3/301 174/138 G |
| 4,781,465 A | * | 11/1988 | Demachi | B60G 17/0165 356/3.07 |
| 5,148,211 A | * | 9/1992 | Kotani | G01S 17/46 356/3.01 |
| 5,604,563 A | | 2/1997 | Nonaka | |
| 5,848,839 A | * | 12/1998 | Savage, Jr. | F21V 31/005 257/E33.059 |

(Continued)

FOREIGN PATENT DOCUMENTS

| JP | 07-110430 | 4/1995 |
| JP | 2000-230807 | 8/2000 |

(Continued)

OTHER PUBLICATIONS

Chinese Office Action dated Apr. 6, 2016 in corresponding Chinese Patent Application No. 201280071825.1.

(Continued)

*Primary Examiner* — Tri Ton
*Assistant Examiner* — Jarreas C Underwood
(74) *Attorney, Agent, or Firm* — Staas & Halsey LLP

(57) ABSTRACT

An imaging device includes: an imaging element that take an image of a subject; and a plurality of light sources that radiate a light to the subject, wherein optical axes of the plurality of the light sources are inclined outward with respect to an optical axis of the imaging element.

5 Claims, 13 Drawing Sheets

(56) References Cited

U.S. PATENT DOCUMENTS

| | | | | |
|---|---|---|---|---|
| 6,154,279 | A * | 11/2000 | Thayer | G01B 11/24 356/602 |
| 6,377,353 | B1 * | 4/2002 | Ellis | A01K 11/006 348/135 |
| 6,538,751 | B2 * | 3/2003 | Ono | G06T 7/0073 356/3.1 |
| 6,618,123 | B2 * | 9/2003 | Uomori | G01S 7/4815 348/131 |
| 6,979,104 | B2 * | 12/2005 | Brass | G01N 21/6447 362/184 |
| 6,992,843 | B2 * | 1/2006 | Juhala | G02B 26/0883 359/665 |
| D559,432 | S * | 1/2008 | Moriyama | G01S 17/46 D26/120 |
| 7,589,825 | B2 * | 9/2009 | Orchard | G01S 17/46 356/4.01 |
| 8,301,027 | B2 * | 10/2012 | Shaw et al. | 398/88 |
| 8,558,161 | B2 * | 10/2013 | Ong et al. | 250/216 |
| 2002/0008055 | A1 * | 1/2002 | Campbell | B07C 5/3422 209/577 |
| 2006/0290781 | A1 | 12/2006 | Hama | |
| 2011/0228252 | A1 * | 9/2011 | Souvestre | G01B 11/002 356/5.01 |

FOREIGN PATENT DOCUMENTS

| | | |
|---|---|---|
| JP | 2004-354307 | 12/2004 |
| JP | 2006-313116 | 11/2006 |
| JP | 2007-010346 | 1/2007 |

OTHER PUBLICATIONS

International Search Report mailed May 1, 2012 in corresponding International Application PCT/JP2012/058163.

* cited by examiner

FIG. 1A
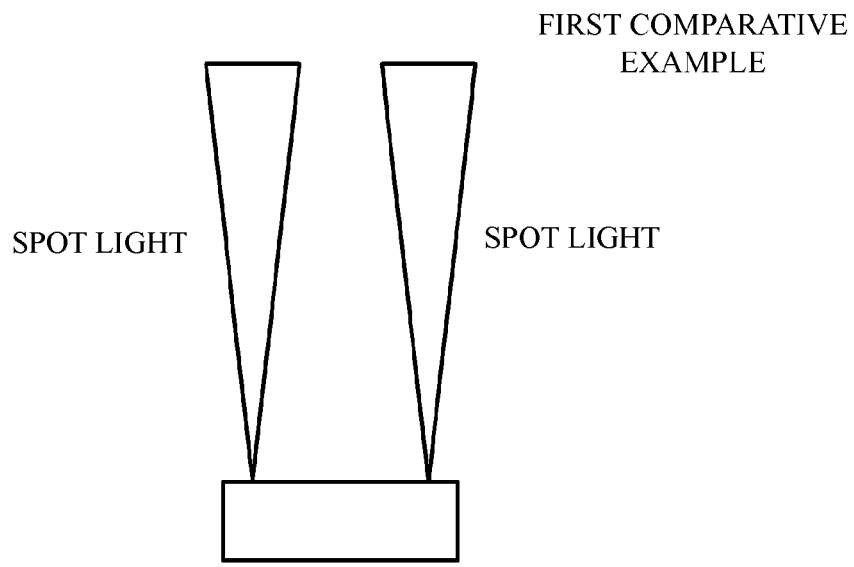
FIRST COMPARATIVE EXAMPLE
SPOT LIGHT          SPOT LIGHT
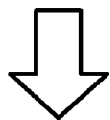
FIG. 1B
SECOND COMPARATIVE EXAMPLE
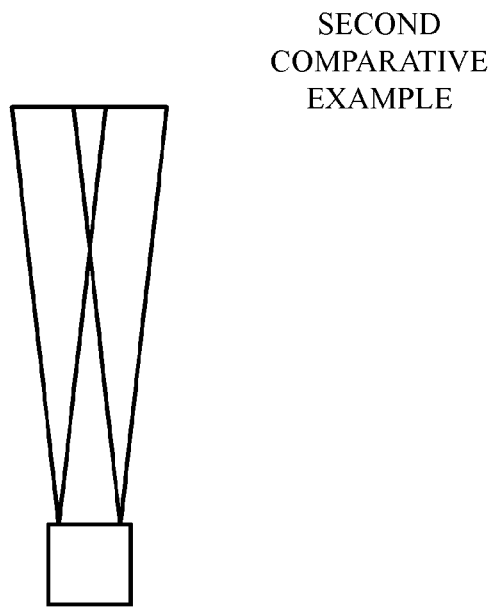

FIG. 3A

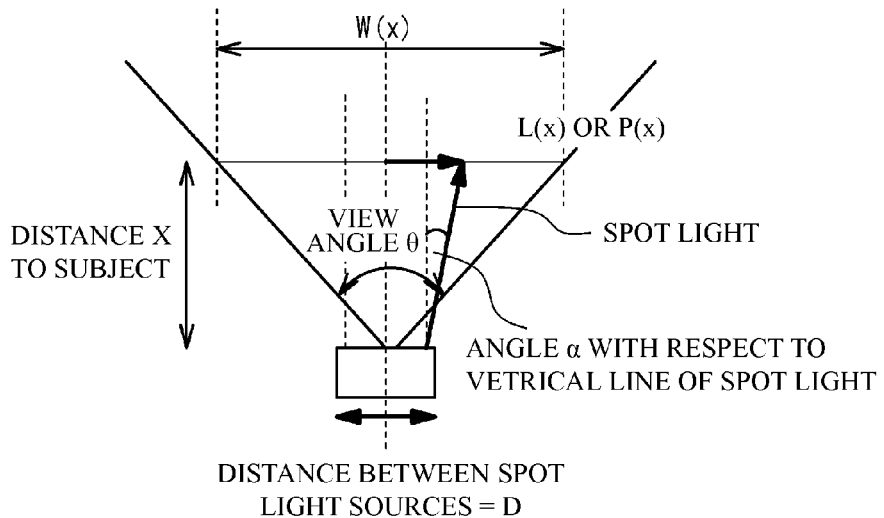

FIG. 3B

| VARI-ABLE | MEANING |
|---|---|
| D | DISTANCE BETWEEN SPOT LIGHT SOURCES [mm] |
| x | DISTANCE TO SUBJECT [mm] |
| $\theta$ | VIEW ANGLE OF LENS (rad.) |
| $\alpha$ | INCLINATION ANGLE OF SPOT LIGHT (rad.) |
| W(x) | IMAGING WIDTH [mm] AT DISTANCE X [mm] |
| L(x) | DISTANCE FROM SCREEN CENTER TO DETECTED POSITION OF SPOT LIGHT [mm] |
| P(x) | DISTANCE FROM SCREEN CENTER TO DETECTED POSITION OF SPOT LIGHT [PIXEL] |
| K | PIXEL NUMBER OF IMAGING ELEMENT |

SPOT LIGHT

PICTURE

ILLUMINATION AREA

ILLUMINATION AREA

SPOT LIGHT

PICTURE

FIG. 10

| DISTANCE TO SUBJECT [mm] | $P_1(x)$ [Pixel] | $P_2(x)$ [Pixel] | $P_3(x)$ [Pixel] | $P_4(x)$ [Pixel] |
|---|---|---|---|---|
| 30 | xxx xxx | xxx xxx | xxx xxx | xx xx |
| 40 | xxx xxx | xxx xxx | xxx xx | xx xx |
| 50 | xxx xxx | xxx xx | xxx xx | xx xx |
| 60 | xxx xxx | xxx xx | xxx xx | xx xx |
| 70 | xxx xx | xxx xx | xxx xx | xx xx |
| 80 | xxx xx | xxx xx | xxx xx | xx x |

IMAGING DEVICE

CROSS-REFERENCE TO RELATED APPLICATION(S)

This application is a continuation application of International Application PCT/JP2012/058163 filed on Mar. 28, 2012 and designated the U.S., the entire contents of which are incorporated herein by reference.

FIELD

A certain aspect of the embodiments is related to an imaging device.

BACKGROUND

There is known an imaging device that has a function of detecting a distance, an inclination and so on of a subject with taking an image of the subject without contact. Patent Document 1 discloses an imaging device that has a distance sensor having a laser and using an optical triangulation method. Patent Document 2 discloses a technology in which a light of an LED is focused and projected on a subject and a camera takes an image of the subject.

PRIOR ART DOCUMENT

Patent Document

Patent Document 1: Japanese Laid-open Patent Publication No. 2000-230807
Patent Document 2: Japanese Laid-open Patent Publication No. 2007-10346

SUMMARY

According to an aspect of the present invention, there is provided an imaging device including: an imaging element that take an image of a subject; and a plurality of light sources that radiate a light to the subject, wherein optical axes of the plurality of the light sources are inclined outward with respect to an optical axis of the imaging element.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A illustrates a schematic view of an imaging device in accordance with a first comparative example;
FIG. 1B illustrates a schematic view of a small imaging device in accordance with a second comparative example;
FIG. 3A and FIG. 3B are drawings for describing a definition of each parameter of an imaging device;
FIG. 10 illustrates an example of a calibration table obtained in advance.

DESCRIPTION OF EMBODIMENTS

A description will be given of comparative example before describing embodiments. FIG. 1A illustrates a schematic view of an imaging device in accordance with a first comparative example. With reference to FIG. 1A, the imaging device of the first comparative example has a light source that emits a spot light. The imaging device detects a distance between an imaging element and a subject by detecting a position of the subject (hereinafter referred to as a spot position) to which an emitted light is radiated. The light from the light source gradually diffuses along a propagation direction. When an inexpensive light source is used, the light diffuses dynamically. When the imaging device has a given size, spot lights do not interfere with each other. Therefore, the diffusion of the light is not a problem.

However, downsizing is required for the imaging device. For example, the downsizing is required for the imaging device when the imaging device acts as a mobile device such as a smart phone in addition to a fixed imaging device. In a field demanding downsizing, not an expensive device but low cost is often demanded. Therefore, there is a limit in focusing of a light.

FIG. 1B illustrates a schematic view of a small imaging device in accordance with a second comparative example. With reference to FIG. 1B, when an imaging device is downsized, a distance of light sources is reduced. In this case, spot lights interfere with each other. When the spot lights interfere with each other, detection accuracy of the spot light is degraded, and a detection accuracy of a distance between an imaging element and a subject is reduced. It is preferable that the interference is suppressed, in order to suppress cost and downsize the imaging device. And so, a description will be given of an imaging device of which cost can be suppressed and of which downsizing is possible.

Figure 2:
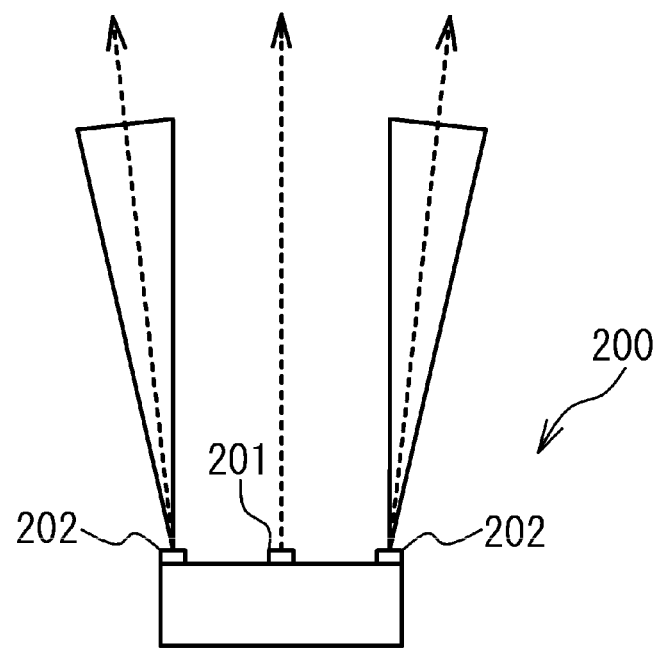
FIG. 2 illustrates a schematic view of an imaging device applied to embodiments.

A description will be given of a principle applied to the following embodiments. FIG. 2 illustrates a schematic view of an imaging device 200 applied to the following embodiments. With reference to FIG. 2, the imaging device 200 has a structure in which a plurality of light sources 202 are provided around an imaging element 201. The imaging element 201 is not limited when the imaging element 201 is capable of taking an image. The imaging element 201 is, for example, a CMOS (Complementary Metal Oxides Semiconductor) camera. The light source 202 is not limited, when the light source 202 is a light source of which emitted light diffuses along a radiation direction. For example, an LED can be used as the light source 202.

Each of the light sources 202 is arranged so that a radiation direction of a spot light is inclined outward with respect to an optical axis of the imaging element 201. In this case, a diffusion of the spot light of the light source 202 toward the imaging element 201 side is suppressed. With the structure, even if the imaging device 200 is downsized, the interference of the spot lights is suppressed. It is not necessary to use an expensive light source of which focusing degree is high. That is, it is possible to suppress a cost and downsize the imaging device 200. It is preferable that the inclination directions of the spot optical axes of the two light sources 202 are opposite to each other.

It is possible to increase focusing degree by using a structure in which a non-spherical lens and a plurality of lenses are combined as a lens for a spot light. However, there is a problem that the cost may be increased to make the structure. The structure is not suitable for a small and expensive imaging device because accuracy needed for making of the structure increases. For example, in order to use the non-spherical lens, high accuracy locating is needed, and improvement of accuracy for assembling is needed. Therefore, the cost may increase. When the structure having a plurality of lenses is used, extra number of components is needed. When a plurality of lenses are mounted, a specific height of the imaging device is needed. Therefore, the imaging device may grow in size.

On the other hand, in the imaging device 200 of FIG. 2, the optical axis of the spot light is inclined outward with respect to the optical axis of the imaging element. And, additional components and improvement of assembling accuracy are not needed. Therefore, additional component cost is not needed. Therefore, the imaging device has a large advantageous as a small imaging device. An algorism for measuring a distance that is the same as a current algorism can be used. Therefore, newly necessary cost for development is not necessary.

A description will be given of influence of a case where the optical axis of the spot light is inclined outward with respect to the optical axis of the imaging element 201. FIG. 3A and FIG. 3B are drawings for describing a definition of each parameter of the imaging device 200. A distance D is a distance (mm) between each light source 202. A distance x is a distance (mm) between the imaging element 201 and a subject. A view angle θ is a view angle (rad) of a lens provided in the imaging element 201. An inclination angle α is an inclination angle (rad) of an optical axis of a spot light with respect to an optical axis of the imaging element 201. An imaging width W(x) (mm) is an imaging width (a range which the imaging element can take an image) at the distance x (mm) A distance L(x) is a distance (mm) between a center of a picture and a center of a spot position. A distance P(x) is a pixel distance obtained by conversion of the distance L(x) into pixels. K is the number of pixel of a picture element of the imaging element 201.

In the above-mentioned parameters, the distance D, the view angle θ and the inclination angle α are design values and fixed values. On the other hand, the distance L(x) and the distance P(x) are values determined according to the distance x during an imaging. The distance L(x) and the distance P(x) indicate an identical length (a distance from the center of the picture to the center of the spot position) expressed in millimeters and pixels. The distance P(x) is a measured amount of the spot position that is observed during the imaging by the imaging element 201.

The distance L(x) is expressed by the following formula (1). In accordance with the formula (1), the distance L(x) increases in proportion to the inclination angle α indicating the inclination angle of the spot angle.

[Formula 1]

$$L(x) = \frac{D}{2} + x\tan\alpha \quad (1)$$

On the other hand, the imaging width W(x) at the distance x is expressed by the following formula (2) with use of the view angle θ of the imaging element 201. An image of the above-mentioned width W(x) is taken according to K pixels with use of the parameter K (for example 480 pixels) indicating the number of pixels of the imaging element 201.

[Formula 2]

$$W(x) = 2x\tan\left(\frac{\theta}{2}\right) \quad (2)$$

When the above-mentioned formulas (1) and (2) are used, the distance P(x) is expressed by the following formula (3). The following formula (3) is a formula expressing a relation between the center of the spot position and the distance x. With the following formula (3), when the distance x is unknown, the distance x can be calculated from the distance P(x). When the distance x is calculated with respect to each light source 202, the position, the inclination and so on of the subject can be detected. A description will be given of embodiments.

[Formula 3]

$$P(x) = K\frac{L(x)}{W(x)} = K\frac{\frac{D}{2} + x\tan\alpha}{2x\tan\left(\frac{\theta}{2}\right)} = \frac{K}{4\tan\left(\frac{\theta}{2}\right)}\left(\frac{D}{x} + 2\tan\alpha\right) \quad (3)$$

First Embodiment

Figure 4A:
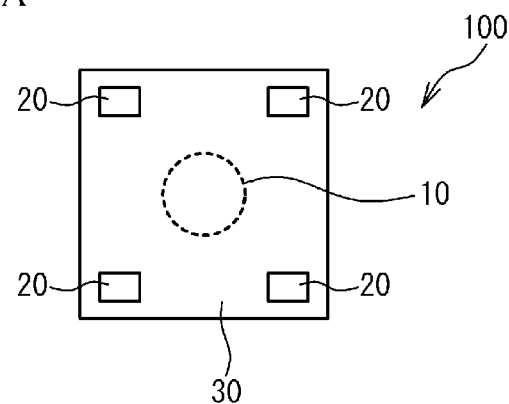
FIG. 4A illustrates a plane view of an imaging device in accordance with a first embodiment.

FIG. 4A illustrates a plane view of an imaging device 100 in accordance with a first embodiment. With reference to FIG. 4A, the imaging device 100 has a structure in which a plurality of light sources 20 are provided around an imaging element 10. For example, the imaging element 10 is arranged in a center portion of a substrate 30 having a rectangular shape. Each of the light sources 20 is arranged in a corner portion of the substrate 30.

Figure 4B:
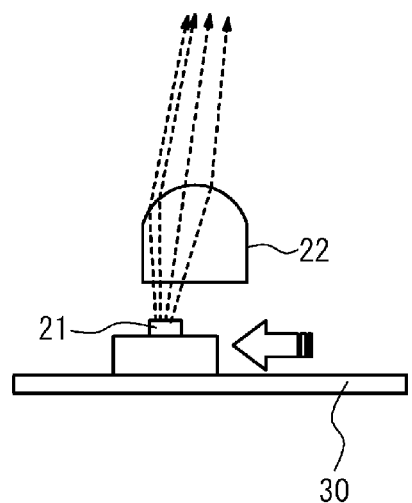
FIG. 4B and FIG. 4C illustrate a side view of a light source.
Figure 4C:
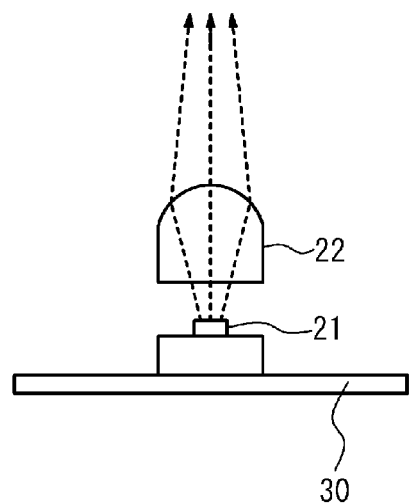

FIG. 4B illustrates a side view of the light source 20. With reference to FIG. 4B, the light source 20 has a light emitter 21 provided on the substrate 30 and a focus lens 22 provided on the light emitter 21. An optical axis of the light emitter 21 is off a center of the focus lens 22. With reference to FIG. 4C, when the optical axis coincides with the center of the center of the focus lens 22, an emitted light of the light emitter 21 goes straight. In contrast, with reference to FIG. 4B, when the optical axis of the light emitter 21 is off the optical axis of the focus lens 22, it is possible to incline the emitted light of the light emitter 21. In concrete, when the light emitter 21 is shifted to the imaging element 10 side from the center of the focus lens 22, a radiation direction of the light emitter 21 can be inclined outward with respect to the optical axis of the imaging element 10.

The light emitter 21 may be inclined with respect to the substrate 30, as a method of inclining the radiation direction of the light emitter 21. However, it is not easy to incline a component on a normal circuit substrate. For example, when a light emitter is mounted on a normal circuit substrate so as to incline, an extra cost is needed. Although only a part of the substrate where the light emitter is mounted may be inclined, the thickness of the imaging device increases in accordance with inclination of the substrate, and thereby downsizing of the imaging device is prevented. When the part where the light emitter is mounted is separated from the substrate, the number of assembling increases and cost increases.

In contrast, in the embodiment, it is not necessary to incline the light emitter 21, and the position of the light emitter 21 is only shifted with respect to the position of the focus lens 22. Therefore, the mounting is easy. The cost can be suppressed. A normal algorism or the like of distance measurement can be used, because only the position of the light emitter 21 is changed.

Figure 5A:
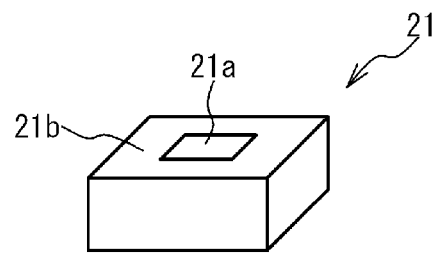
FIG. 5A illustrates a schematic perspective view of a light emitter.

A description will be given of a case where a general LED element is used as the light emitter 21. FIG. 5A illustrates a schematic perspective view of the light emitter 21. With reference to FIG. 5A, the light emitter 21 has a structure in which a reflector 21b reflecting a light is arranged around a light emission portion 21a. The general LED element has a cubic shape or a cuboid shape. A light-emitting face of the light emission portion 21a has a rectangular shape (square shape or oblong shape). The image of the spot position taken by the imaging element 10 is obtained by projecting the shape of the light-emitting face of the light emission portion 21a.

Figure 5B:
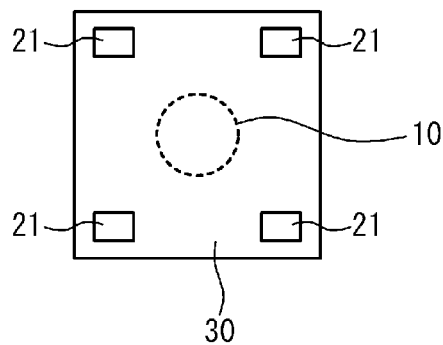
FIG. 5B to FIG. 5E illustrates an example of a location of a light emitter.
Figure 5C:
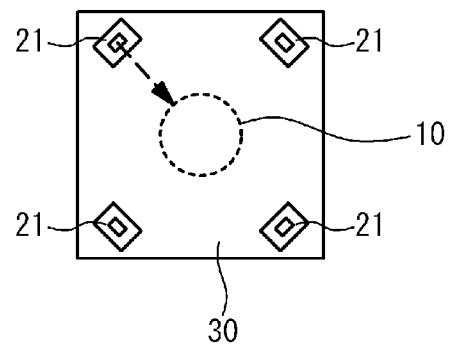
Figure 5D:
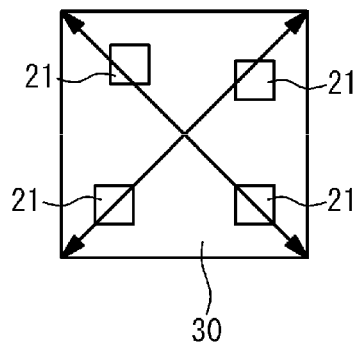
Figure 5E:
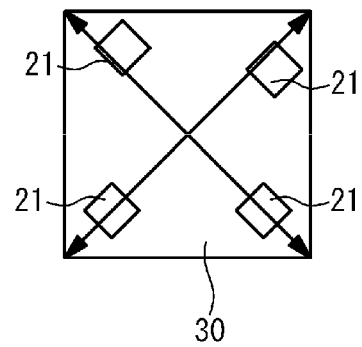

When the light emitter 21 is arranged so that each side of the light emitter 21 is in parallel with each side of the substrate 30 as illustrated in FIG. 5B, line segments of diagonal lines of the substrate 30 overlapped with the light emitters 21 may vary as illustrated in FIG. 5D. This is because the position of the light emitter 21 may be shifted from a desirable position during the mounting of the light emitter 21. For example, when the light emitter 21 is mounted with a solder, the position of the light emitter 21 tends to be shifted from the desirable position. When the distance to the spot position is measured, the spot position is generally searched along the diagonal line of the substrate 30. When the line segments of the diagonal line of the substrate 30 overlapped with the light emitter 21 vary, detection accuracy of the spot position may be degraded.

And so, in the embodiment, as illustrated in FIG. 5C, each of the light emitters 21 is arranged so that a side of the light emitter 21 faces the imagine element 10, compared to the example of FIG. 5B. In this case, as illustrated in FIG. 5D, variability of the line segments of the diagonal lines of the substrate 30 overlapped with the light emitters 21 can be suppressed. Thus, the detection accuracy of the spot position can be improved. When the light emitters 21 are arranged so that a side of the light emitters 21 facing the imaging element 10 is vertical to the diagonal line of the substrate 30, the line segments of the diagonal lines of the substrate 30 overlapped with the light emitters 21 become identical. Therefore, the detection accuracy of the spot position can be improved more.

Second Embodiment

Figure 6A:
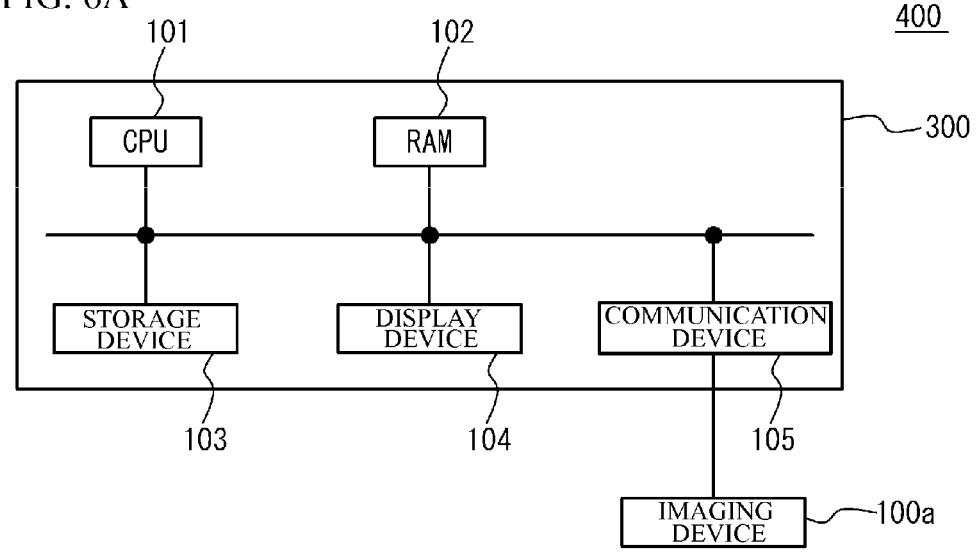
FIG. 6A illustrates a block diagram for describing a hardware structure of a biometric authentication device to which an imaging device in accordance with a second embodiment is applied.
Figure 6B:
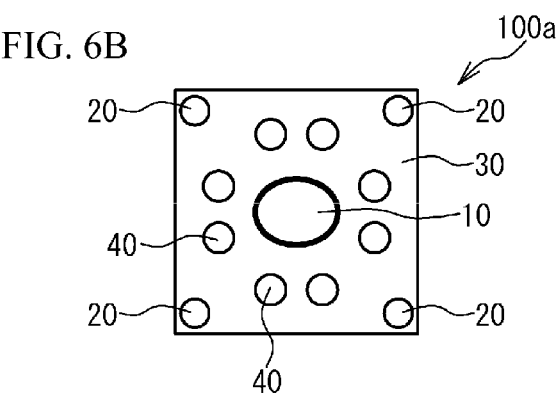
FIG. 6B illustrates a plane view of an imaging device.
Figure 6C:
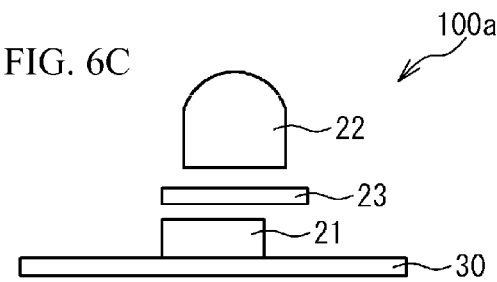
FIG. 6C illustrates a side view of an imaging device.

In a second embodiment, a description will be given of a biometric authentication device to which an imaging device is applied. FIG. 6A illustrates a block diagram for describing a hardware structure of a biometric authentication device 400 to which an imaging device 100a in accordance with the second embodiment is applied. FIG. 6B illustrates a plane view of the imaging device 100a. FIG. 6C illustrates a side view of the imaging device 100a.

With reference to 6A, the biometric authentication device 400 has a structure in which a terminal device 300 having a CPU 101, a RAM 102, a storage device 103, a display device 104, a communication device 105 and so on is coupled with the imaging device 100a. Each component in the terminal device 300 is coupled with each other via a bus or the like. The CPU (Central Processing Unit) 101 is a central processing unit. The CPU 101 includes one or more core. The RAM (Random Access Memory) 102 is a volatile memory temporally storing a program executed by the CPU 101, a data processed by the CPU 101, and so on.

The storage device 103 is a nonvolatile memory device. The storage device 103 may be an SSD (Solid State Drive) such as a ROM (Read Only Memory) or a flash memory, or a hard disk driven by a hard disk drive. A biometric authentication program is stored in the storage device 103. The display device 104 is a liquid crystal display, an electro luminescence panel or the like and shows a result of a biometric authentication process or the like. The communication device 105 is an interface for transmitting and receiving a signal with an outer component. The terminal device 300 is coupled with the imaging device 100a via the communication device 105.

The imaging device 100a is a device obtaining a biometric image of a biometric body of a user as a subject. In the embodiment, the imaging device 100a is a device obtaining a palm vein image of a user without contacting. As illustrated in FIG. 6B, the imaging device 100a has a structure in which the imaging element 10 is arranged in a center portion of the substrate 30, and the light source 20 and the illumination source 40 are arranged around the imaging element 10. The imaging element 10 is a CMOS (Complementary Metal Oxide Semiconductor) camera or the like.

The substrate 30 has a rectangular shape. Each of the light sources 20 are arranged at each corner of the substrate 30. That is, four light sources 20 are provided. The illumination source 40 is an LED emitting a near-infrared ray. Two illumination sources 40 are provided between each of the light sources 20. That is, totally eight illumination sources 40 are provided. The number of the illumination source 40 is not limited.

As illustrated in FIG. 6C, the light source 20 has a structure in which the light emitter 21 is arranged on the substrate 30, and an aperture 23 and the focus lens 22 are arranged on the light emitter 21. The aperture 23 has a hole in a center portion thereof and has a function of enhancing focusing degree by cutting extra light. The aperture 23 may be arranged on an upstream side or a downstream side of the focus lens 22, and may be arranged both on the upstream side and the downstream side of the focus lens 22. The light emitter 21 is shifted toward the imaging element 10 side with respect to the center of the focus lens 22. Therefore, the radiation direction of the light emitter 21 is inclined outward with respect to the optical axis of the imaging element 10. When a common light emitter is used as the illumination source 40 and the light emitter 21, the cost can be reduced.

Generally, the larger the lens diameter is, the more advantageous the focusing of light is. Therefore, in view of a layout of the imaging device 100a, the mounted position of the focus lens 22 is limited. In particular, when the imaging element 10 is provided in the center portion, the position where the focus lens 22 can be mounted is limited. On the other hand, a layout of an interconnection on the substrate 30 can be relatively flexibly changed. Therefore, a freedom degree of arrangement of the light emitter 21 on the substrate 30 is relatively high. Accordingly, the position of the light emitter 21 may be shifted after fixing the focus lens 22.

A lower face of the focus lens 22 that is positioned on the light emitter 21 side may have a planar shape. An upper face of the focus lens 22 may have a spherical shape. When the upper face has the spherical shape, the focus lens 22 can focus a diffusing radiation light effectively. The lower face of the focus lens 22 may have a spherical shape, and the upper face of the focus lens 22 may have a planar shape.

The biometric authentication program stored in the storage device 103 is developed to the RAM 102. The CPU 101 executes the biometric authentication program developed to the RAM 102. Thus, the biometric authentication device 400 executes each process. For example, a biometric data enrollment process, a biometric authentication process and so on are performed. The biometric data enrollment process is a process enrolling a feature data extracted from a biometric image of an unenrolled new user in a database as an enrollment feature data. The biometric authentication process is a process in which a user to be authenticated is identified based on a comparison between a comparison-use feature data extracted from a biometric image obtained during an authentication and an enrollment feature data.

Figure 7:
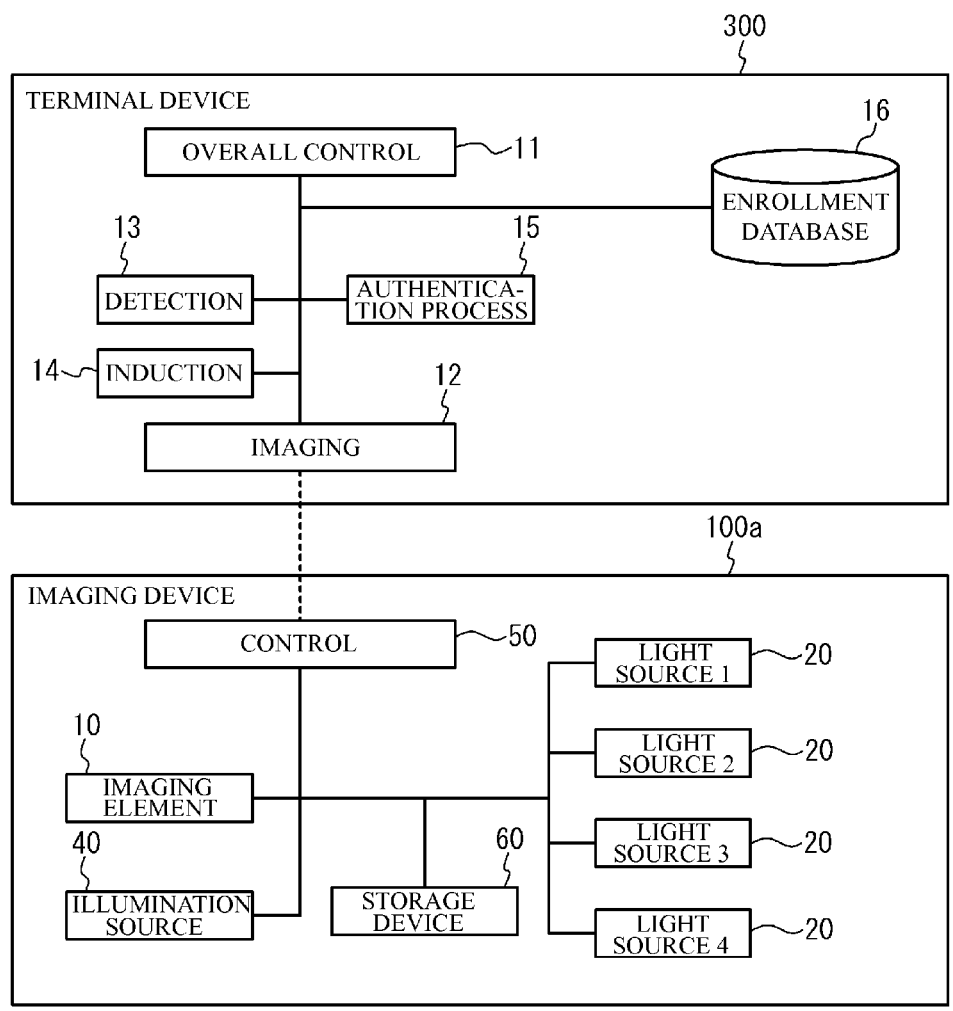
FIG. 7 illustrates a block diagram realized by an execution of a biometric authentication program.

FIG. 7 illustrates a block diagram realized by the execution of the biometric authentication program. By the execution of the biometric authentication program, an overall control unit 11, an imaging unit 12, a detection unit 13, an induction unit 14, an authentication process unit 15 and an enrollment database 16 are realized. The overall control unit 11 controls the imaging unit 12, the detection unit 13, the induction unit 14 and the authentication process unit 15. The imaging unit 12 controls the imaging device 100a and obtains a biometric image of a user from the imaging device 100a.

The detection unit 13 detects a distance between the imaging element 10 and a subject and an inclination of the subject with use of a spot light image obtained by the imaging device 100a. The detection unit 13 may be provided in the imaging device 100a. The detection unit may be divided into the terminal device 300 and the imaging device 100a. In this case, a detection unit of the terminal device 300 may measure a distance with high accuracy for a purpose of using the distance for the authentication process by the authentication process unit 15. Further, another detection unit of the imaging device 100a may only detect a subject and induce a distance. And a simple calculation method (a thinning process is included) may be applied.

The induction unit 14 performs an induction process with respect to a subject in accordance with a detection result of the detection unit 13. The induction unit 14 induces a user so that the distance x and the inclination of the subject are within an adequate range. For example, the induction unit 14 induces the user by showing a message to the user on the display device 104.

The authentication process unit 15 extracts a feature data from a biometric image obtained by the imaging unit 12. For example, the authentication process unit 15 extracts a vein pattern. The authentication process unit 15 extracts an enrollment feature data during the biometric data enrollment process, enrolls the enrollment feature data in the enrollment database 16, and extracts a comparison-use feature data during the biometric authentication process. The authentication process unit 15 identifies a user to be authenticated by comparison between the comparison-use feature data and the enrollment feature data enrolled in the enrollment database 16.

The imaging device 100 has a control unit 50 and a storage device 60. The control unit 50 controls the imaging element 10, the light source 20 and the illumination source 40 in accordance with an instruction of the imaging unit 12.

Figure 8A:
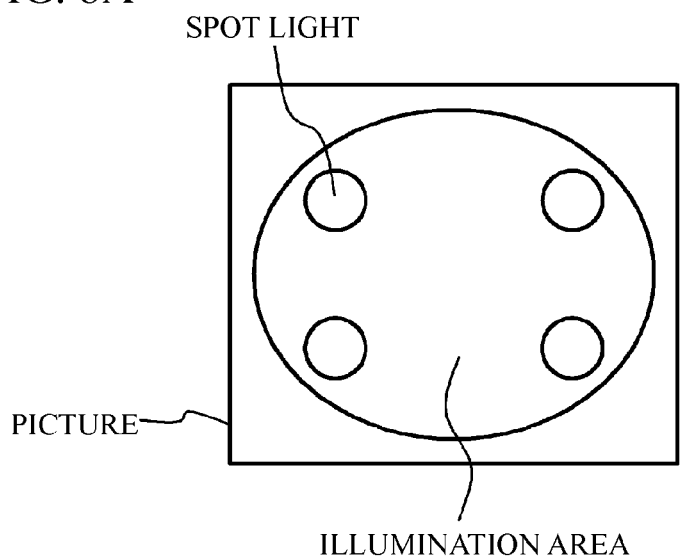
FIG. 8A and FIG. 8B illustrate an example of a spot light image.
Figure 8B:
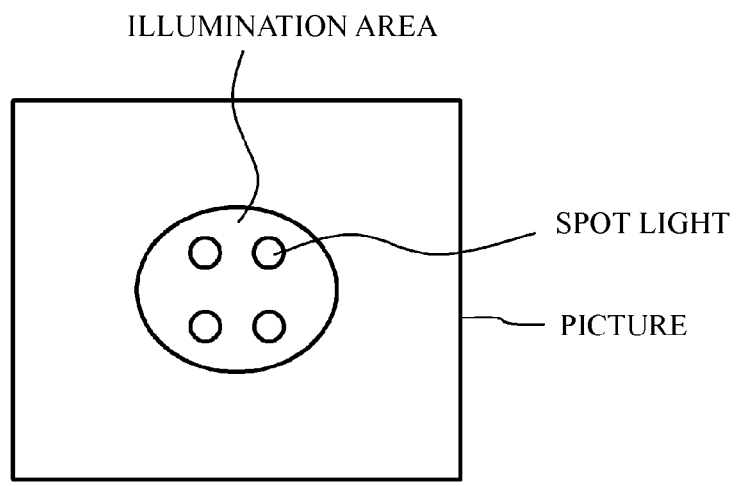

Next, a description will be given of an algorism of measuring a distance between the imaging element 10 and a subject. FIG. 8A and FIG. 8B illustrate an example of a spot light image. FIG. 8A is an example of a case where a distance between the imaging device 100a and the subject is small. FIG. 8B is an example of a case where the distance between the imaging device 100a and the subject is large. When the subject is close to the imaging device 100a, an area of the subject in a picture obtained by the imaging element 10 is large, and the spot light is detected on an edge side of the picture. A region of the spot light on the picture is a spot light image. On the other hand, when the subject is far from the imaging device 100a, the area of the subject in the picture obtained by the imaging element 10 is small, and the spot light image is detected near the center of the picture.

The detection unit 13 detects the position of the spot light from the image obtained by the imaging element 10. First, the detection unit 13 searches a spot position along a diagonal line (45 degrees line) of the substrate 30 from a start point that is a center position O of the spot light image. In concrete, the detection unit 13 obtains a luminance value of the image on the 45 degrees line in order, and determines that the spot starts when the luminance value exceeds a threshold value Th. The detecting of the spot position is repeated as many times as the number of the light sources 20. In the embodiment, four light sources 20 are provided. Therefore, the detection unit 13 performs the searching totally four times with respect to the light sources 20.

Figure 9A:
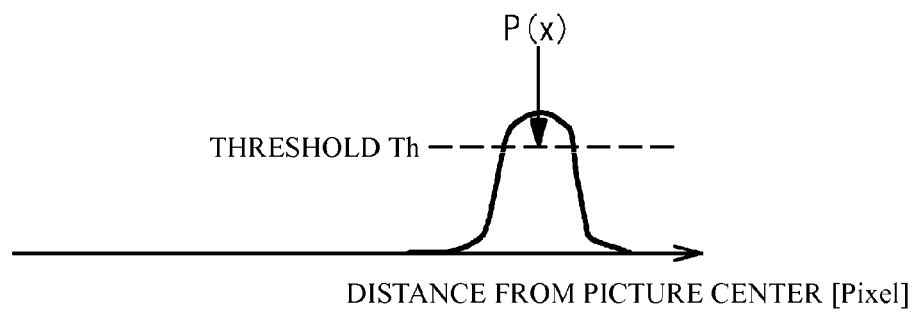
FIG. 9A and FIG. 9B are drawings for describing a spot detection.
Figure 9B:
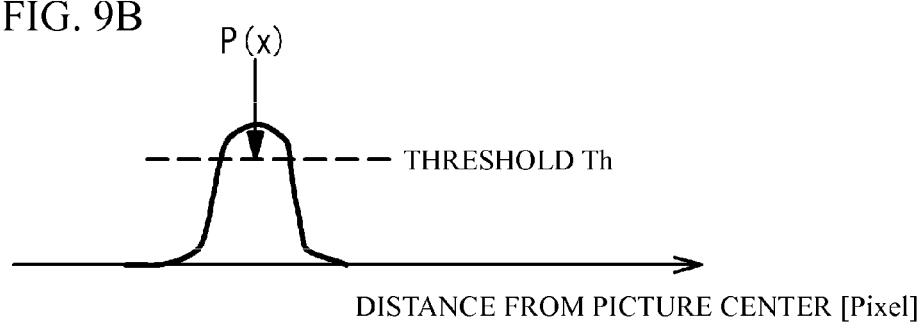

The detection unit 13 obtains the distance P(x) between the center of the picture and the center of the spot position. For example, reliability of positions of a rising and a falling of the spot is low because the spot light itself diffuses with distance. The positions of the rising and the falling of the spot are generally unclear. FIG. 9A and FIG. 9B are drawings for describing the spot detection. In FIG. 9A and FIG. 9B, a horizontal axis shows a distance on the 45 degrees line in pixel, and a vertical axis indicates a luminance value. In concrete, the detection unit 13 obtains a range on the 45 degrees line more than the threshold Th and sets a center of the range as the P(x). The luminance value of the spot differs according to the distance of the subject. Therefore, the threshold Th may be changed according to the distance from the center of the picture. The detection unit 13 calculates the distance x in accordance with the following formula (4) with use of the above-obtained distance P(x).

[Formula 4]

$$x = \frac{KD}{4\tan\left(\frac{\theta}{2}\right)P(x) - 2K\tan\alpha} \quad (4)$$

There may be an error in the set position of the light source 20. Therefore, there may be an error in the detected position of the spot. The error has a unique value with respect to each of the imaging devices 100a. Therefore, a correspondence relation between the distance P(x) and the distance x may be measured in advance as a calibration for shipping, and the relation may be stored in the storage device 60 of the imaging device 100a.

In concrete, a subject may be provided at the position of the distance x in advance, and the distance P(x) measured on this occasion may be stored in a table. FIG. 10 illustrates an example of a calibration table obtained in advance. With the structure, distance measurement with higher accuracy can be performed. When the calibration table illustrated in FIG. 10 is obtained in advance, a distance other than the distances stored in the table can be calculated by an interpolation process. For example, a linear interpolation process may be used. This process approximates two adjacent distances by a straight line.

A start position of searching a spot light may be stored as a calibration. In the above-mentioned, it is assumed that the start position of searching a spot position is a center of a picture. This procedure is not a problem when accuracy of a spot light source is high to some extent. However, when an assembly accuracy of the spot light source is very low, the spot may be possibly off the 45 degrees line even if the spot is searched on the 45 degrees line. In this case, the problem may be solved by storing the start position of searching as a calibration data.

A relation between the distance x and the distance P(x) may be obtained with an approximate curve without a table. When a constant of the above-mentioned formula (4) is replaced, the following formula (5) is obtained. In the following formula (5), "A" and "B" are unknown constant terms. Here, pixel distances $P(x_0)$, $P(x_1)$, $P(x_2)$ etc. corresponding to a plurality of distances $x_0$, $x_1$, $x_2$ etc. are measured as a calibration. When these relations are expressed by a matrix, the following formula (6) can be obtained.

[Formula 5]

$$x = \frac{1}{AP(x) - B} \quad (5)$$

[Formula 6]

$$\begin{pmatrix} x_0 P(x_x) & -x_0 \\ x_1 P(x_1) & -x_1 \\ \vdots & \vdots \end{pmatrix} \begin{pmatrix} A \\ B \end{pmatrix} = \begin{pmatrix} 1 \\ 1 \end{pmatrix} \quad (6)$$

When a left side matrix of the above formula (6) is expressed by "X", the above formula (6) can be expressed by the following formula (7).

[Formula 7]

$$X \begin{pmatrix} A \\ B \end{pmatrix} = \begin{pmatrix} 1 \\ 1 \end{pmatrix} \quad (7)$$

There is known a method of using a pseudo-matrix ($X^+$) as the following formula (8) as a method of obtaining "A" and "B" having a minimum error satisfying the above formula (7). However, $X^+$ is $(X^T X)^{-1} X^T$. "T" indicates a transposition. "−1" indicates an inverse matrix. When "A" and "B" obtained above are applied to the above formula (5), the distance x can be calculated.

[Formula 8]

$$\begin{pmatrix} A \\ B \end{pmatrix} = X^+ \begin{pmatrix} 1 \\ 1 \end{pmatrix} \quad (8)$$

An optimal value of the inclination angle α is determined according to an operation condition of the imaging device 100a. First, it is necessary to consider the following point as a unique influence of obliquely radiating the spot light. When the spot light is radiated vertically to the subject, an identical range is radiated by the spot light without dependence of the distance. On the other hand, when the radiation direction is inclined, the range to which the spot light is radiated is enlarged with the distance. Therefore, as the distance increases, the spot light is possibly off the subject. When the spot light is off the subject, it is not possible to correct the inclination by measuring four points and the situation is an obstacle to the authentication process. In view of this point, in the embodiment, the biometric authentication process is operated by dividing a distance range into a distance allowing authentication and a distance allowing induction.

Figure 11:
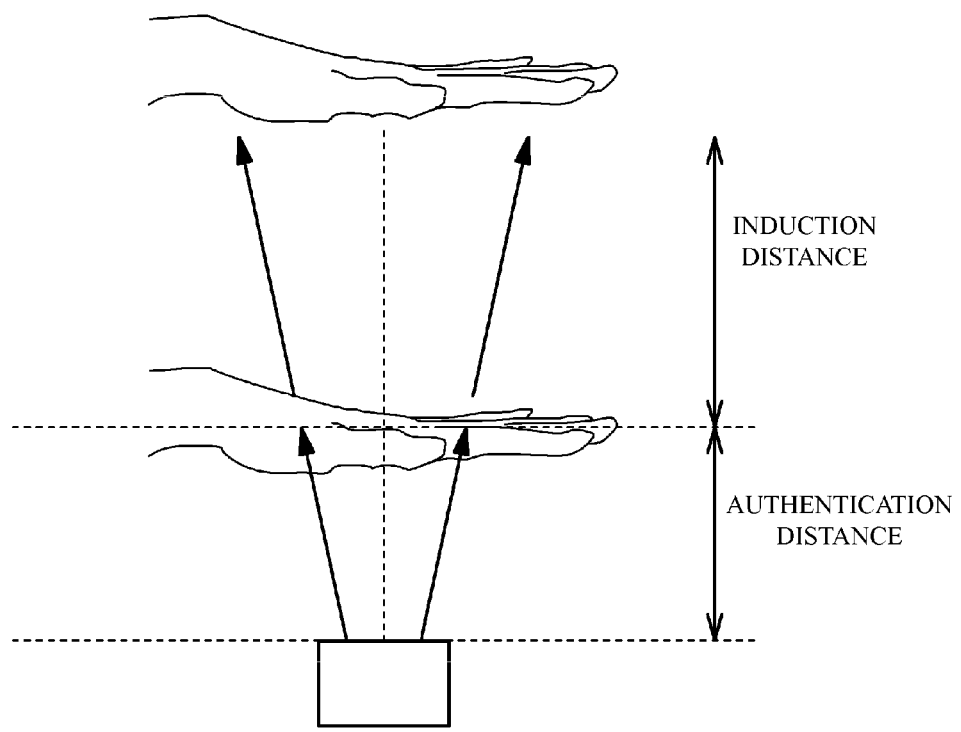
FIG. 11 illustrates a distance allowing an authentication and a distance allowing an induction.

FIG. 11 illustrates the distance allowing authentication and the distance allowing induction. With reference to FIG. 11, the distance allowing authentication is a distance range in which imaging with use of four points of spot lights is secured in spec. When the subject is within the distance range, it is possible to use detection of inclination with use of four points of spot lights or the like. The distance allowing induction is a distance allowing the induction with use of at least one of the four points of spot lights. At the distance allowing the induction, all of the four points of spot lights are not radiated to the subject, because the spot light is inclined outward. As a result, there may be a case where the detection of the inclination of the subject cannot be performed in the distance range. In particular, with respect to a person of which hand is small, the spot light is possibly off the subject. On the other hand, detection of the subject and the induction of the distance with use of one of the four points can be performed. Generally, when the subject is too far, the biometric authentication process is not performed and only an induction "please bring your hand closer" is often performed. Therefore, even if the operation is performed by dividing the distance range as mentioned above, there is no influence in an actual usage.

Figure 12:
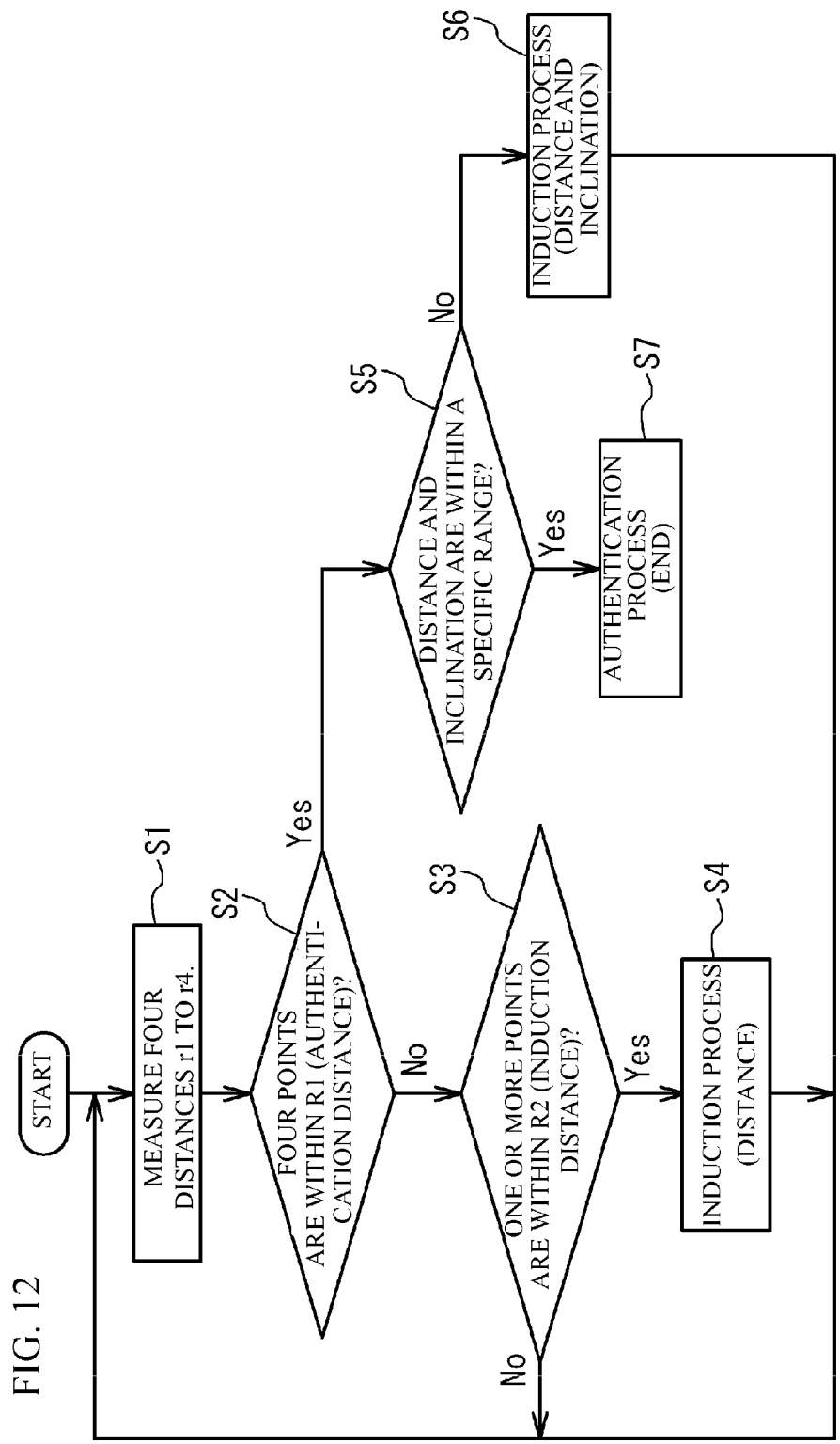
FIG. 12 is a drawing for describing a flowchart executed during an induction according to the above distance range.

FIG. 12 is a drawing for describing a flowchart executed during the induction according to the distance range. With reference to FIG. 12, the detection unit 13 obtains distances r1 to r4 based on the spot positions of the four light sources 20 (Step S1). Next, the detection unit 13 determines whether all of the four points are within a distance range R1 allowing the authentication (Step S2). When it is determined as "No" in the Step S2, the detection unit 13 determines whether one or more points are within a distance range R2 allowing induction (Step S3). When it is determined as "Yes" in the Step S3, the induction unit 14 performs inducing of the subject (Step S4). After that, the Step S1 is executed again.

When it is determined as "Yes" in the Step S2, the detection unit 13 determines whether the distance and the inclination of the subject is within a predetermined range (Step S5). When it is determined as "No" in the Step S5, the induction unit 14 performs inducing the subject (Step S6). After that, the Step S1 is executed again. When it is determined as "Yes" in the Step S5, the authentication process unit 15 performs the authentication process (Step S7). With the processes, it is possible to take an image of the subject with an adequate distance and an adequate inclination.

Figure 13:
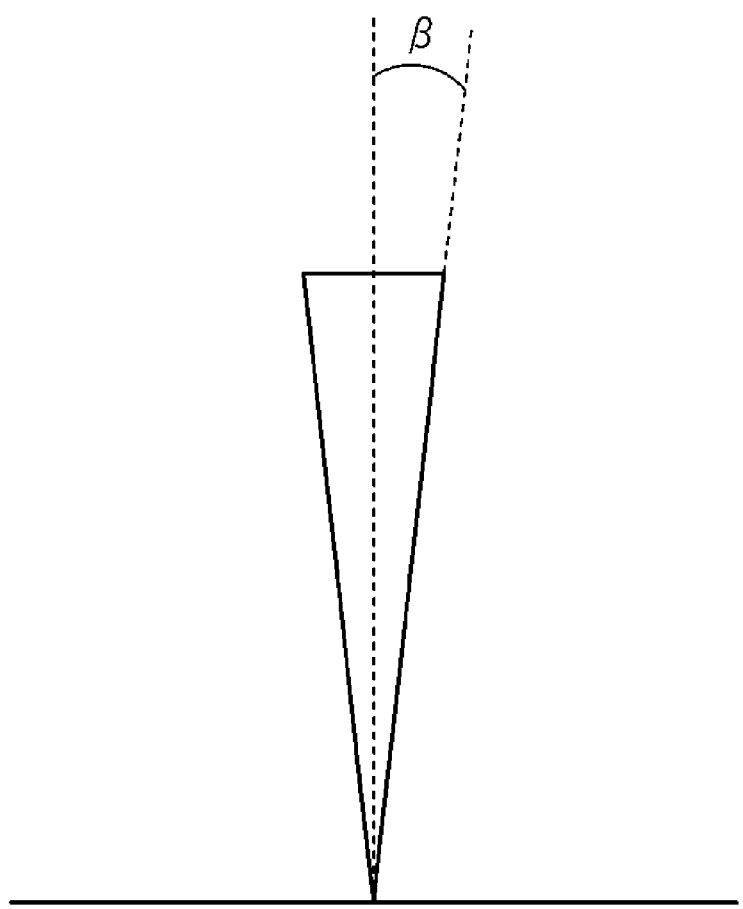
FIG. 13 is a drawing for describing a diffusion angle $\beta$ of a spot light.

Next, a description will be given of an optimal value of the inclination angle α of the radiation light of the light source 20 in the above-mentioned embodiments. A correspondence relation of a positional shift DX giving the inclination angle α can be measured in advance by a simulation or an actual measurement. When the inclination angle α is too small, spot lights interfere with each other. It is therefore preferable that necessary minimum inclination angle $α_{min}$ is adequately set. With reference to FIG. 13, the inclination angle $α_{min}$ is a value determined dependently on a diffusion angle β of a spot light. That is, when the inclination angle α is set to be larger than the diffusion angle β of the spot light, the spot lights have a distance D from each other and thereby do not interfere with each other. The diffusion angle β of the spot light can be obtained by an optical simulator or an actual measurement.

Even if the inclination angle α is smaller than the diffusion angle β, the spot lights do not interfere with each other within a given distance range. Therefore, the structure may be allowed. In concrete, within the distance range of the following formula (9), the operation does not have a problem. Based on the condition, the minimum inclination angle $\alpha_{min}$ of the inclination angle α may be determined. When the minimum inclination angle $\alpha_{min}$ is determined, a corresponding position shift amount $DX_{min}$ of the LED can be set.

[Formula 9]

$$x < \frac{D}{2}\left(\frac{1}{\tan(\beta - \alpha)}\right) \quad (9)$$

On the other hand, when the inclination angle α is too large, the spot light may be off the subject. Therefore, the maximum inclination angle $\alpha_{max}$ of the inclination angle α may be set with use of the distance allowing authentication that is an operation condition as a reference. In concrete, the maximum inclination angle $\alpha_{max}$ of the inclination angle α may be determined from the maximum value $R_{1max}$ of the supposed distance allowing authentication and the size $L_{min}$ of the supposed minimum subject. The $L_{min}$ is a minimum value of the size of the palm in the example of the vein authentication. Even if the position of the palm is shifted, the $L_{min}$ may be a size in which the four spot lights can be measured.

The maximum inclination angle αmax is determined by the following formula (10) under a condition that a radiated spot light is within a range of a size $L_{min}$ at the distance $R_{1max}$. When the maximum inclination angle $\alpha_{max}$ is determined, the position shift amount $DX_{max}$ and the position shift amount $DX_{min}$ are determined.

[Formula 10]

$$\tan\alpha_{max} = \frac{L_{min} - D}{2R_{1max}} \quad (10)$$

An assembly error of a light emitter during a mounting by a solder or the like is larger than that of a general optical component. And so, it is preferable to consider an error in mounting when structuring a spot optical system with use of a light emitter. When an error in mounting of a light emitter is ΔX, a design value of a position shift amount DX of a light emitter can be determined as follows. It is necessary to compensate for a minimum shift amount $DX_{min}$ even if there is an error ΔX, in order to prevent interference between spot lights. Therefore, a value in which ΔX is added to the minimum shift amount $DX_{min}$ is a minimum value $DX_{min}'$ of a required DX ($DX_{min}'=DX_{min}+\Delta X$). On the other hand, with respect to the maximum inclination angle $\alpha_{max}$, when the inclination angle α is equal to or more than the maximum inclination angle $\alpha_{max}$, it is possible that the detection of a palm is failed. It is therefore preferable that the inclination angle α is equal to or less than the maximum inclination angle $\alpha_{max}$ even if there is the error ΔX. Therefore, a value in which the error ΔX is subtracted from the maximum shift amount $DX_{max}$ is a maximum value $DX_{max}'$ of an allowed DX ($DX_{max}'=DX_{max}-\Delta X$). Accordingly, it is preferable that the position shift amount DX of a light emitter is set within a range $DX_{min}' \leq DX \leq DX_{max}'$.

A storage medium storing a program of a software for realizing the functions of the biometric authentication device 400 may be supplied to the biometric authentication device 400, and the CPU 101 may execute the program. The storage medium for supplying the program is a CD-ROM, a DVD, a Blu-ray, an SD card or the like. In the above-mentioned embodiments, each function is realized when the CPU executes the program. However, a dedicated circuit or the like may realize each function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An imaging device comprising:
    an imaging element that takes an image of a subject;
    a plurality of rectangular light sources that radiate a light to the subject, each of the plurality of the light sources having a light emitter and a focus lens;
    a substrate on which the plurality of rectangular light sources are arranged such that a flat side of the rectangular light source is normal to the imagining element; and
    a processor configured to detect a luminance value along a line that is parallel with a surface of the substrate and passes through the imaging element in the image taken by the imaging element,
    wherein:
    a light-emitting face of the light emitter has a rectangular shape in each of the plurality of light sources; and
    a side of the rectangular shape faces the imaging element and is vertical to the line.

2. The imaging device as claimed in claim 1, wherein:
    optical axes of the plurality of the light sources are inclined outward with respect to an optical axis of the imaging element; and
    one or more of the light emitters are located so that each of optical axes of the light emitters is shifted on the imaging element side with respect to a center of the focus lens in each of the plurality of the light sources.

3. The imaging device as claimed in claim 1, further comprising:
    a distance detection unit that detects a distance between the imaging element and the subject by detecting a spot position appearing when lights radiated from the plurality of the light sources are reflected by the subject.

4. The imaging device as claimed in claim 3, further comprising:
    a storage unit that stores a correspondence relation between the spot position and the distance between the imaging element and the subject.

5. The imaging device as claimed in claim 1, wherein the subject is a biometric body.

* * * * *